United States Patent [19]

Matsuhiro et al.

[11] Patent Number: 5,254,510
[45] Date of Patent: Oct. 19, 1993

[54] HEAT RESISTIVE PHOSPHATE SINTERED BODIES AND A PROCESS FOR PRODUCING THE SAME

[75] Inventors: Keiji Matsuhiro, Nagoya; Tsuneaki Ohashi, Ohgaki, both of Japan

[73] Assignee: NGK Insulators, Ltd., Japan

[21] Appl. No.: 573,816

[22] Filed: Aug. 28, 1990

[30] Foreign Application Priority Data

Sep. 7, 1989 [JP] Japan .................. 1-232080

[51] Int. Cl.$^5$ .................................... C04B 35/48
[52] U.S. Cl. ................... 501/104; 501/102; 501/103; 501/106; 423/306
[58] Field of Search ......... 501/104, 102, 103, 106; 423/306

[56] References Cited

U.S. PATENT DOCUMENTS 4,925,816  5/1990  Watanabe et al. ............. 501/104

FOREIGN PATENT DOCUMENTS 260893  9/1987  European Pat. Off. .
306242  8/1988  European Pat. Off. .
3609730  9/1986  Fed. Rep. of Germany .

Primary Examiner—Mark L. Bell
Assistant Examiner—Paul Marcantoni
Attorney, Agent, or Firm—Parkhurst, Wendel & Rossi

[57] ABSTRACT

A heat resistive phosphate sintered body including a solid solution of $R_yZr_4Si_xP_{6-x}O_{24}$ in which $0 \leq x \leq 2$, $\frac{2}{3} \leq y \leq 2$, R is a combination of one or more of cations having 2-3 valences, and x and y meet an electrically neutral condition, wherein a thermal expansion hysteresis loss is not more than 0.3%, and a dimensional change after a heat cycling in which heating and cooling are repeated between 100° C. and 1,200° C. at 100 times is not more than 1%. A process for producing such a heat resistive phosphate is also disclosed. The process includes the steps of preparing a batch mixture, as a starting material, of $(ZrO)_2P_2O_7$, $ZrP_2O_7$, RO and/or a phosphate of R in which R is a combination of one or more of cations having two or three valences, and if necessary further $SiO_2$, calcining, milling and shaping the thus prepared mixture, and firing the thus shaped body, wherein a calcining temperature is not less than 1,400° C. and equal to or higher than a firing temperature, the starting material is a powder milled to an average particle diameter of not more than 7 μm, and the firing temperature is not less than 1,300° C.

19 Claims, 2 Drawing Sheets

HEAT RESISTIVE PHOSPHATE SINTERED BODIES AND A PROCESS FOR PRODUCING THE SAME

BACKGROUND OF THE INVENTION

1. Field of the Invention

The present invention relates to heat resistive phosphate sintered bodies and a process for producing the same. More particularly, the invention relates to heat resistive phosphate sintered bodies which have excellent heat cycling stability while their dimensional changes after heat cycling are not more than 1%, although the sintered bodies contain microcracks. The invention also relates to a process for producing such heat resistive phosphate sintered bodies.

2. Related Art Statement

Recently, demands for materials having excellent heat resistance and low expansion have been increasing with advance in industrial technologies.

Among such demands, it has been made clear that zirconyl phosphate $(ZrO)_2P_2O_7$ is promising as a material having excellent heat resistance and low expansion.

Further, zirconyl phosphates of alkali metals such as sodium have recently been proposed as materials having good heat resistance and low coefficients of thermal expansion (Mat. Res. Bull., Vol. 19, pp 1451-1456 (1984), Journal of Materials Science 16, 1633-1642 (1981) and Yogyo Association Report, No. 95 [5], pp. 531-537 (1987)).

Further, phosphate compounds of alkaline earth metals, which have specific compositions, have been proposed as compounds having low expansion [Mat. Res. Bull., Vol. 20, pp. 99-106, 1985, J. Am. Ceram. Soc., 70 [10] C232-C236 (1987), and U.S. Pat. No. 4,801,566].

U.S. Pat. No. 4,675,302 proposes ceramic materials having a fundamental composition of $Ca_{0.5}Ti_2P_3O_{12}$ as having low expansion.

Further, trials have been effected to combine a specific phosphate compound with zircon to obtain a composite material (Journal of Materials Science, Vol. 20, 4617-4623 (1985) and EP-0 260 893A2.

In addition, EP-0 30 6242 A2 discloses a solid solution of $R_yZr_4Si_xP_{6-x}O_{24}$, sintered bodies containing such a solid solution, and a process for producing the same.

However, although the phosphate compound such as zirconyl phosphate advantageously has low expansion, such a phosphate is thermally decomposed at high temperatures of not less than 1,200° C., and a phosphor component (P) evaporates. For example, when thermally treated at 1,400° C. for 100 hours, zirconyl phosphate and sodium zirconyl phosphate exhibit as much as 19% and 36% in weight reduction, respectively.

Further, ceramic materials proposed in U.S. Pat. No. 4,675,302 are mainly used as substrates for low expansion optical reflectors which are free from deformations due to temperature changes and which have low expansion. Those optical reflectors are to be used in artificial satellite. As shown in an FIG. 2, it is presumed that the temperature change is considered to be up to around 500° C. at the maximum. However, no attention is paid upon heat stability and wear resistance at high temperatures of not less than, for example, 1,200° C.

Incidentally, as a process for producing phosphate compounds, a process is known, which uses $Na_2CO_3$, $ZrO_2$, $ZrOCl_2\cdot 8H_2O$, $SiO_2$, $(NH_2)_2HPO_4$, $H_3PO_4$, $Nb_2O_5$, $Y_2O_3$, $SrCO_3$, $K_2CO_3$, $CaCO_3$ and the like in combination [T. Oota and I. Yamai, Journal of the American Ceramic Society, 69, 1 (1986)].

However, since a $P_2O_5$ component is singly produced in a decomposing step of ammonium phosphate or $H_3PO_4$ in this process, the concentration of phosphorus locally becomes higher so that a compound having a low melting point is formed during sintering. Consequently, great pores (voids) are formed around the low melting point compound in the sintered body to cause grave defects.

Further, sintered bodies of specific phosphates suffer dimensional increase or decreased strength in a heat cycling deterioration test by repeatedly heating and cooling for instance between 100° C. to 1,260° C. As the case may be, the sintered bodies may be broken.

SUMMARY OF THE INVENTION

Having made various investigations to solve the above-mentioned conventional problems, the present inventors have found out that heat resistive phosphate sintered bodies having excellent heat cycling resistance can be obtained by controlling a calcining step under specific conditions and setting a firing temperature at not less than a given temperature in a process for mixing, calcining and milling raw materials, shaping the mixture, and firing the shaped bodies. The inventors have accomplished the present invention based on the above discovery.

That is, it is an object of a first aspect of the present invention to provide a heat resistive phosphate sintered body comprising a solid solution of $R_yZr_4Si_xP_{6-x}O_{24}$ in which $0 \leq x \leq 2$, $\frac{2}{3} \leq y \leq 2$, R is a combination of one or more of cations having 2-3 valences, and x and y meet an electrically neutral condition, wherein a thermal expansion hysteresis loss is not more than 0.3%, and a dimensional change after a thermal cycling in which a heating and cooling are repeated between 100° C. and 1,200° C. for 100 times is not more than 1%.

It is an object of a second aspect of the present invention to provide a process for producing a heat resistive phosphate sintered body having an excellent stability against heat cycling, the process comprising the steps of preparing a batch mixture, as a starting material, of $(ZrO)_2P_2O_7$, $ZrP_2O_7$, RO and/or a phosphate of R in which R is a combination of one or more cations having two or three valences, and if necessary further $SiO_2$, calcining, milling and shaping the thus prepared mixture, and firing the thus shaped body, wherein a calcining temperature is not less than 1,400° C. and equal to or higher than a firing temperature, the mixture is a powder milled to the average particle diameter of not more than 7 μm, and the firing temperature is not less than 1,300° C.

The sintered body according to the present invention is fundamentally composed of a solid solution of $R_yZr_4Si_xP_{6-x}O_{24}$. In this solid solution, a combination of one or more kinds of elements capable of exhibiting two or three valences is selected as R, x is a value not less than 0 to not more than 2, and y is a value not less than $\frac{2}{3}$ but not more than 2. In the above composition, it is necessary that x and y meet an electrically neutral condition. If monovalent elements are contained as R, high temperature stability becomes poorer, while if x exceeds 2, heat resistance decreases.

R denotes a combination of one or more elements capable of exhibiting two or three valence cations, and ordinarily denotes elements belonging to Group IIa of the Periodic Table. It is preferable that R is constituted by at least one of barium (Ba), strontium (Sr) and calcium (Ca).

The sintered body according to the present invention has the thermal expansion hysteresis loss of not more than 0.3%, preferably, 0.03 to 0.25%. Thus, the sintered body has excellent dimensional stability.

According to the sintered body of the present invention, the weight-reduced percentage due to evaporation of phosphorus can be suppressed to a low value of not more than 5% even after heat treatment at 1,400° C. for 100 hours. In addition, the four point flexural strength after heat cycling in which heating and cooling are repeated between 100° C. and 1,260° C. for 100 times can be suppressed to not less than 100 kgf/cm$^2$, more preferably not less than 200 kgf/cm$^2$. Furthermore, the self-weight softening percentage after heat treatment at 1,400° C. for 5 hours is not more than 1%. Thus, the sintered body according to the present invention meets the requirements for the heat resistive materials.

The sintered body according to the present invention also has a small dimensional change rate. When the sintered body is thermally heated at 1,400° C. for 100 hours, the dimensional change rate is not more than 3.5%. Thus, the sintered body according to the present invention satisfies the requirements necessary as the heat resistive materials. Moreover, in the sintered body, the coefficient of thermal expansion in a temperature range from room temperature to 900° C. is as small as more than $25 \times 10^{-7}$/°C., preferably not more than $10 \times 10^{-7}$/°C. This low coefficient of thermal expansion is maintained even when the sintered body is subjected to heat cycling in which heating and cooling are repeated between 100° C. and 1,260° C. at 100 times. Thus, it is seen that the sintered body according to the present invention has excellent thermal shock resistance. Therefore, the sintered bodies according to the invention, which have the above-mentioned characteristics, are favorably used as materials required to have heat resistance and thermal stability at high temperatures, for example, ceramic honeycomb structural bodies such as automobile exhaust gas purification catalyst carriers, rotary regeneration type ceramic heat exchangers, heat conductive type heat exchangers, turbocharger rotor housings, engine manifold-insulating materials and diesel particulate filters.

According to the process for producing the heat resistive sintered bodies in the present invention in which the starting materials are mixed, calcined, ground, and shaped, followed by firing, it is characterized in that the shaped body is fired at temperatures not less than 1,400° C. If the calcining temperature is less than 1,400° C., the heat resistance and the dimensional stability in the heat cycling of the sintered bodies become poorer. Further, the calcining temperature fundamentally needs to be higher than the use temperature for the sintered bodies.

As the starting materials, it is preferable to use a batch material composed of $(ZrO)_2P_2O_7$, $ZrP_2O_7$, RO and/or a phosphate of R, and if necessary $SiO_2$. The above compositions are stable compounds, which are difficult to become non-uniform during the shaping and firing steps and thus ca be fired at high temperatures. On the other hand, when a conventionally used phosphate is used as a $P_2O_5$ source for the starting material, the mixture becomes non-uniform because phosphoric acid is liquid. Consequently, as mentioned above, the concentration of phosphorus becomes locally higher, so that the compound having the low melting point is formed during the calcining step.

Moreover, it is important to mill the calcined powder to the average particle diameter of not more than 7 μm, preferably not more than 2.5 μm. The reason why the average particle diameter is set at not more than 7 μm is that the sintered body having the thermal expansion hysteresis loss of not more than 0.3% with excellent dimensional stability can be obtained.

With respect to RO as the component for the starting material, a stable compound which is converted to RO during firing, for example, a hydroxide, a carbonate and a sulfate can selectively be used therefor.

The starting material having the average particle diameter of not more than 50 μm, preferably not more than 10 μm is used.

In the producing process according to the present invention, after the calcined powder is milled, the ground material is plasticized with use of a plasticizer. The plasticized material is shaped by extrusion, followed by drying and firing. This process is preferred from the standpoint of easy shaping.

As the firing conditions for the fired products according to the present invention, the firing temperature is not less than 1,300° C., preferably 1,400° to 1,600° C., and the firing time is 1-24 hours, preferably 2-10 hours. When the firing temperature is set at not less than 1,300° C., the calcined and milled powder is fully sintered so that the fired products according to the present invention can be obtained. If the firing time is less than 1 hour, sintering is insufficient. On the other hand, if it is more than 24 hours, the strength deceases due to abnormal grain growth, and a different phase is precipitated owing to evaporation of the phosphorus component.

Furthermore, the calcining temperature needs to be higher than the firing temperature, and preferably 1,500° to 1,600° C. If the calcining temperature is less than the firing temperature, the abnormal grain growth occurs during the firing, or the microstructure of the fired body is insufficiently stabilized. Consequently, the dimensional increase due to the heat cycling becomes greater. The calcining time is 1-24 hours, and preferably 2-10 hours.

Preferred embodiments of the present invention mentioned above are summarized below.
a) The heat resistive phosphate sintered body has a thermal expansion hysteresis loss of 0.03-0.25%.
b) The heat resistive phosphate sintered body has a coefficient of thermal expansion of not more than $10 \times 10^{-7}$/° C.
c) The heat resistive phosphate sintered body has a weight reduction rate of not more than 5% in the heat treatment of 1,400° C. × 100 hours.
d) The heat resistive phosphate sintered body has a self-weight softening percentage of not more than 1% in the heat treatment of 1,400° C. × 5 hours.
e) The heat resistive phosphate sintered body has a dimensional change rate of not more than 3.5% in the heat treatment of 1,400° C. × 100 hours.
f) The heat resistive phosphate sintered body has a four point flexural strength of not less than 100 kg/cm$^2$, preferably not less than 200 kg/cm$^2$.
g) The heat resistive phosphate sintered body has a coefficient of thermal expansion of not more than $10 \times 10^{-7}$/° C. after the heat cycling.
h) The heat resistive phosphate sintered body has a honeycomb structure.

i) The heat resistive phosphate sintered body comprises a combination of one or more of elements of Group IIa of the Periodic Table.
j) The process for producing the heat resistive phosphate sintered body comprises the step of milling the calcined powder to the average grain size of not more than 2.5 μm.
k) The process for producing the heat resistive phosphate sintered body comprises the steps of plasticizing the batch mixture of the raw materials, shaping the mixture through extrusion, and drying and firing the shaped body.
l) The process for producing the heat resistive phosphate sintered body comprises the keeping time in each of the steps of the calcining and the firing being 1-24 hours, preferably 2-10 hours.
m) The process for producing the heat resistive phosphate sintered body comprises calcining at a temperature of 1,500°-1,600° C.
n) The process for producing the heat resistive phosphate sintered body comprises firing at a temperature of 1,400°-1,600° C.

BRIEF DESCRIPTION OF THE ATTACHED DRAWINGS

For a better understanding of the invention, reference is made to the attached drawings, wherein.

DETAILED DESCRIPTION OF THE INVENTION

In the following, the present invention will be explained based on concrete examples, with the understanding that the invention is not limited to them.

EXAMPLES 1-12 AND COMPARATIVE EXAMPLES 21-24

According to a formulating recipe shown in Table 1, zirconyl phosphate [$(ZrO)_2P_2O_7$], zirconium phosphate ($ZrP_2O_7$), calcium carbonate, strontium carbonate, barium carbonate, yttria, and/or silica were mixed. The grain size of the zirconia phosphate had preliminarily been adjusted by using a vibration mill filled with $ZrO_2$ sintered media having a diameter of about 5 mm. The grain size may be adjusted by using a pot mill or an attritor mill. As the $ZrO_2$ sintered media, $ZrO_2$ sintered media stabilized with MgO or those F stabilized with $Y_2O_3$ was used. The chemical composition of the media used is shown in Table 2. The analyzed chemical compositions of the raw materials used are shown in Table 3.

Figure 1:
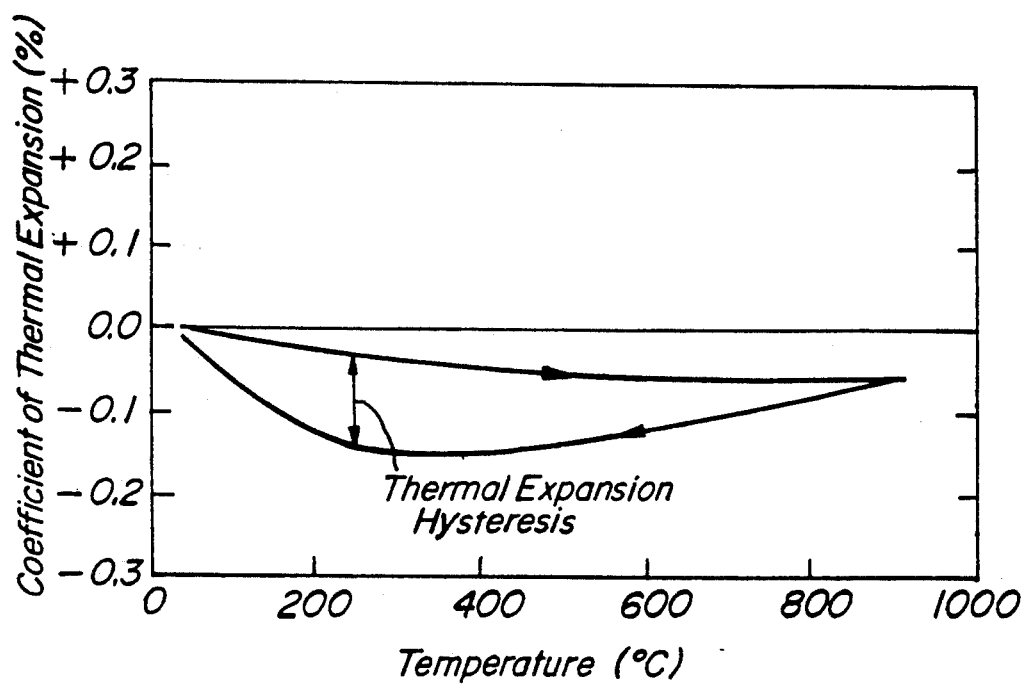
FIG. 1 is a graph illustrating a thermal expansion-shrinkage curve (thermal expansion hysteresis) of Example 1.

The formulated mixture shown in Table 1 was filled into a crucible, and calcined in an electric furnace in air under conditions shown in Table 1. The heating rate was 5°-1,700° C./hr. After calcining, the calcined body was crushed, and milled to the average particle size shown in Table 1 by using the vibration mill with the media. As mentioned above, the mixture might be milled with a pot mill or an attrition mill. After drying, 5 parts by weight of a 10% PVA aqueous solution was added to and fully mixed with 100 parts by weight of the milled powder. The mixture was press shaped into a shape of $25 \times 80 \times 6$ mm by a mold under pressure of 100 kg/cm$^2$, and further rubber pressed under a pressure of 2 ton/cm$^2$. After the shaped body was dried, the dried body was fired in the electric furnace in air under conditions shown in Table 1. The heating rate was 5°-1,700° C./hr. After the firing, the sintered body was worked in a shape of $3 \times 4 \times 40$ mm as a flexural test piece prescribed in JIS R 1601 (1981). The thus obtained test pieces were subjected to measurements for the weight reduction rate and the dimensional change rate in a heat treatment of 1,400° C. for 100 hours, the coefficient of thermal expansion in a range from 40°-900° C., the four point flexural strength, the self-weight softening percentage, the open porosity, and the dimensional change in the heat cycling. For the measurement of the coefficient of thermal expansion, a push rod type differential thermal expansion meter employing a quartz glass was used. As shown in FIG. 1, the maximum value among differences in the coefficient of thermal expansion between during the heating and during the cooling was taken as the thermal expansion hysteresis. The temperature range in the measurement was 40°-900° C. The four point flexural strength was measured according to the method prescribed in JIS R 1601. The self-weight softening percentage was determined as follows: First, a flexural test piece of $3 \times 4 \times 40$ mm was placed on supports spaced by 30 mm as shown in FIG. 5, and heated at 1,400° C. for 5 hours in air, a self-weight change rate $\Delta x$ was measured, and the self-weight softening percentage was determined by filling the measured weight change rate $\Delta x$ in the following equation: Self-weight softening percentage = $\Delta x / 1 \times 100 (\%)$.

The open porosity was measured by the Archimedean method. The melting point was visually judged by observing whether a sintered body cut in a shape of $3 \times 4 \times 5$ mm was melted or not in a thermal treatment at 1,700° C. for 10 minutes in the electric furnace.

Figure 2:
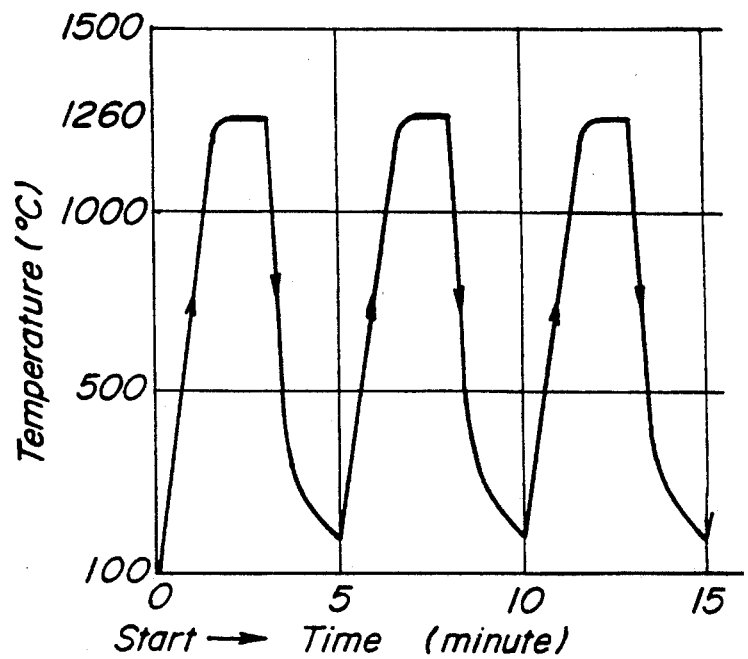
FIG. 2 is a graph illustrating a heating-cooling schedule in heat cycling tests.
Figure 3:
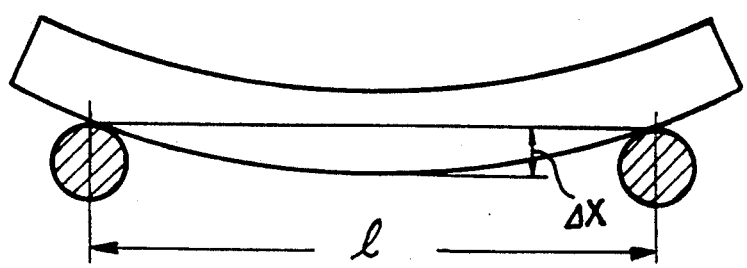
FIG. 3 is a view illustrating a method for measuring a self-weight softening percentage in a heat treatment of 1,400° C. for 5 hours.

The heat cycling test was effected by repeatedly placing a test piece into the electric furnace held at a given temperature and taking it out therefrom. FIG. 2 shows a graph illustrating a heating-cooling schedule in the heat cycling test. The temperature is a temperature which a thermocouple set near the test piece exhibited.

As to the solid solution of $R_yZr_4Si_xP_{6-x}O_{24}$, it was judged that this solid solution was produced when the phase satisfied the indexes of $CaZr_4(PO_4)_6$ in JCPDS 33-321, $SrZr_4(PO_4)_6$ in JCPDS 33-1360 or $BaZr_4(PO_4)_6$ in JCPDS 34-95.

As to the other crystalline phases, only whether the crystalline phases were present or not were determined by X ray diffraction patterns. The lattice constants of the solid solutions were calculated by determining a diffraction angle 2 θ at a (018) plane of $R_yZr_4Si_xP_{6-x}O_{24}$ and that at a (208) plane thereof, determining d-values $d_{018}$ and $d_{208}$, and calculating "a" and "c" based on the following simultaneous equations:

$$1/d^2_{018} = 4/3a^2 + 64/c^2 \text{ and}$$

$$1/d^2_{208} = 16/3a^2 + 64/c^2.$$

TABLE 1

| | Example | | | | | | | | | | | | Comparative Example | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 21 | 22 | 23 | 24 |
| Formulating recipe (wt %) | | | | | | | | | | | | | | | | |
| $Zr_2P_2O_9$ | 52.5 | 52.5 | 52.5 | 52.5 | 52.5 | 46.9 | 46.9 | 49.2 | 49.2 | 49.7 | 63.9 | 52.5 | 52.5 | 52.5 | 52.5 | 49.2 |
| $Zr_2P_2O_7$ | 22.8 | 22.8 | 22.8 | 22.8 | 22.8 | 38.3 | 38.3 | 21.3 | 21.3 | 30.1 | 12 | 22.8 | 22.8 | 22.8 | 22.8 | 21.3 |
| $CaCO_3$ | 0 | 0 | 0 | 0 | 0 | 11.9 | 11.9 | 0 | 0 | 0 | 0 | 0 | 0 | 0 | 0 | 0 |
| $SrCO_3$ | 19.5 | 19.5 | 19.5 | 19.5 | 19.5 | 0 | 0 | 0 | 0 | 0 | 5 | 19.5 | 19.5 | 19.5 | 19.5 | 0 |
| $BaCO_3$ | 0 | 0 | 0 | 0 | 0 | 0 | 0 | 24.6 | 24.6 | 13.5 | 6.8 | 0 | 0 | 0 | 0 | 24.6 |
| $CaP_2O_R$ | 0 | 0 | 0 | 0 | 0 | 0 | 0 | 0 | 0 | 0 | 7 | 0 | 0 | 0 | 0 | 0 |
| $Y_2O_3$ | 0 | 0 | 0 | 0 | 0 | 0 | 0 | 0 | 0 | 2.6 | 0 | 0 | 0 | 0 | 0 | 0 |
| $SiO_2$ | 5.2 | 5.2 | 5.2 | 5.2 | 5.2 | 2.9 | 2.9 | 4.9 | 4.9 | 4.1 | 5.3 | 5.2 | 5.2 | 5.2 | 5.2 | 4.9 |
| Chemical composition (mole %) | | | | | | | | | | | | | | | | |
| $CaZr_4P_6O_{24}$ | | | | | | 92 | 92 | | | | 42 | | | | | |
| $SrZr_4P_6O_{24}$ | 83 | 83 | 83 | 83 | 83 | | | | | 50 | 21 | 83 | 83 | 83 | 83 | |
| $BaZr_4P_6O_{24}$ | | | | | | | | 83 | 83 | | 21 | | | | | 83 |
| $Y_2Zr_4P_6O_{24}$ | | | | | | | | | | 37.5 | | | | | | |
| $CaZr_4Si_6O_{24}$ | | | | | | 8 | 8 | | | | 8 | | | | | |
| $SrZr_4Si_6O_{24}$ | 17 | 17 | 17 | 17 | 17 | | | | | 12.5 | 4 | 17 | 17 | 17 | 17 | 17 |
| $BaZr_4Si_6O_{24}$ | | | | | | | | 17 | 17 | | 4 | | | | | |
| Producing conditions | | | | | | | | | | | | | | | | |
| Calcining temperature (°C.) | 1500 | 1500 | 1500 | 1500 | 1500 | 1400 | 1450 | 1600 | 1700 | 1600 | 1500 | 1600 | 1500 | 1600 | 1350 | 1500 |
| Keeping time (hr) | 5 | 5 | 5 | 5 | 5 | 5 | 5 | 24 | 2 | 5 | 24 | 10 | 2.5 | 13 | 5 | 5 |
| Average particle diameter of milled powder (micron) | 0.8 | 0.8 | 0.8 | 2.5 | 5.1 | 0.8 | 1 | 1.4 | 2 | 1 | 1 | 7 | | | 0.8 | 2 |
| Firing temperature (°C.) | 1400 | 1450 | 1500 | 1500 | 1500 | 1300 | 1450 | 1600 | 1700 | 1600 | 1450 | 1600 | 1600 | 1600 | 1400 | 1250 |
| Keeping time (hr) | 5 | 5 | 5 | 5 | 5 | 10 | 5 | 2 | 1 | 5 | 24 | 1 | 5 | 5 | 10 | 24 |
| Crystalline phase | | | | | | | | | | | | | | | | |
| Main crystalline phase | $SrZr_4P_6O_{24}$ | $SrZr_4P_6O_{24}$ | | | | $CaZr_4P_6O_{24}$ | $CaZr_4P_6O_{24}$ | $BaZr_4P_6O_{24}$ | $BaZr_4P_6O_{24}$ | $SrY_{0.25}Zr_4$-$Si_{0.75}P_{5.25}O_{24}$ | $Ca_{0.74}Sr_{0.37}Br_{0.37}$-$Zr_4Si_{0.96}P_{5.04}O_{24}$ | $SrZr_4P_6O_{24}$ | $SrZr_4P_6O_{24}$ | $BaZr_4P_6O_{24}$ | $BaZr_4P_6O_{24}$ | $BaZr_4P_6O_{24}$ |
| Second crystalline phase | $Sr_4Zr_4Si_6O_{24}$ absent | | | | | $Ca_4Zr_4Si_6O_{24}$ | $Ca_4Zr_4Si_6O_{24}$ | $Ba_4Zr_4Si_6O_{24}$ | $Ba_4Zr_4Si_6O_{24}$ | | | | $Sr_4Zr_4Si_6O_{24}$ | $Sr_4Zr_4Si_6O_{24}$ absent | $Sr_4Zr_4Si_6O_{24}$ | $Ba_4Zr_4Si_6O_{24}$ |
| Solid solution: | | | | | | absent | | absent | absent | absent | absent | | | | | absent |
| Lattice constant of main crystalline phase | | | | | | | | | | | | | | | | |
| a (Å) | 8.74 | 8.74 | 8.74 | 8.74 | 8.74 | 8.79 | 8.79 | 8.69 | 8.69 | 8.65 | 8.69 | 8.74 | 8.74 | 8.74 | 8.74 | 8.69 |
| c (Å) | 23.34 | 23.34 | 23.34 | 23.34 | 23.34 | 22.68 | 22.68 | 24 | 24 | 23.43 | 22.89 | 23.34 | 23.34 | 23.34 | 23.34 | 24 |
| Firing shrinkage factor (%) | 19.1 | 21.8 | 22.4 | 16.3 | 9.7 | 17.9 | 20.4 | 18.2 | 20.6 | 21.9 | 12 | 21 | 21.6 | 14 | 10.3 | 8 |
| Characteristics of sintered body | | | | | | | | | | | | | | | | |
| Open porosity (%) | 14 | 4 | 3 | 8 | 5 | 18 | 11 | 15 | 5 | 12 | 15 | 3 | 1 | 9 | 23 | 33 |
| Flexural strength (kg/cm²) | 660 | 530 | 470 | 290 | 230 | 400 | 420 | 610 | 290 | 450 | 580 | 150 | 90 | 120 | 190 | 30 |
| Weight-reduced percentage (1400° C. × 100 hr, %) | 0.3 | 0.3 | 0.3 | 0.3 | 0.3 | 0.6 | 0.6 | 0.4 | 0.4 | 1.1 | 0.6 | 0.3 | | | | |
| Dimensional change rate (1400° C. × 100 hr, %) | −3.5 | −0.8 | −0.2 | −0.2 | −0.2 | −5.3 | −0.17 | −0.1 | 0 | −0.1 | −0.3 | −0.2 | | | | |
| Self-weight softening percentage (1400° C. × 5 hr, %) | 0.7 | 0.05 | 0.02 | 0.02 | 0.02 | 0.9 | 0.07 | 0.01 | 0.08 | 0.1 | 0.3 | 0.06 | | | | |
| Coefficient of thermal expansion (× 10⁻⁷/°C., RT-900° C.) | −8 | −15 | −17 | −21 | −20 | 8 | 1 | 10 | 2 | 15 | 25 | −31 | | | | |
| Thermal expansion hysteresis (%) | 0.1 | 0.11 | 0.09 | 0.11 | 0.1 | 0.06 | 0.08 | 0.04 | 0.03 | 0.04 | 0.03 | 0.25 | | | | |
| Melting point (°C.) | >1700 | >1700 | >1700 | >1700 | >1700 | >1700 | >1700 | >1700 | >1700 | >1700 | >1700 | >1700 | >1700 | >1700 | >1700 | >1700 |
| Characteristics after heat | | | | | | | | | | | | | | | | |

TABLE 1-continued

| | Example | | | | | | | | | | | | Comparative Example | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 21 | 22 | 23 | 24 |
| cycling (100–1260° C., 100 times of number of repetition) | | | | | | | | | | | | | | | | |
| Dimensional change rate (%) | −0.2 | 0.3 | 0.5 | 0.9 | 1 | 0.9 | 0.7 | 0.4 | 0.5 | 0.4 | 0.2 | 1 | 3 | | | |
| Flexural strength (kg/cm$^2$) | 430 | 430 | 140 | 210 | 200 | 150 | 200 | 390 | 230 | 300 | 480 | 100 | | 3.9 | 6.3 | broken |
| Coefficient of thermal expansion ($\times 10^{-7}$/°C., RT-900° C.) | −1.5 | −24 | −20 | −26 | −28 | 5 | −3 | 0 | −6 | 11 | 23 | −31 | | | | |

TABLE 2

|  | $ZrO_2$ grinding media stabilized with MgO | $ZrO_2$ grinding media stabilized with $Y_2O_3$ |
| --- | --- | --- |
| $SiO_2$ | 0.28 | <0.05 |
| $Al_2O_3$ | 0.037 | <0.02 |
| $Fe_2O_3$ | 0.14 | 0.10 |
| $TiO_2$ | 0.12 | <0.01 |
| CaO | 0.29 | <0.005 |
| MgO | 3.37 | 0.007 |
| $K_2O$ | 0.010 | <0.005 |
| $Na_2O$ | 0.047 | <0.01 |
| $Y_2O_3$ | — | 5.04 |
| $ZrO_2$ | 94.19 | 92.90 |
| $HfO_2$ | 1.65 | 2.11 |
| Total | 100.13 | 100.16 |

TABLE 3

| | Chemical analysis values | | | | | | | | | | | Chemical analysis values | | | | Average particle |
| --- | --- | --- | --- | --- | --- | --- | --- | --- | --- | --- | --- | --- | --- | --- | --- | --- |
| | $ZrO_2$ | $P_2O_5$ | $SiO_2$ | $Al_2O_3$ | MgO | CaO | NaKO | Ig. loss | $Fe_2O_3$ | SrO | BaO | $CeO_2$ | $Gd_2O_3$ | $TiO_2$ | $Y_2O_3$ | diameter (μm) |
| $(ZrO)_2P_2O_7$ | 61.85 | 36.38 | <0.2 | 0.01 | 0.45 | 0.02 | 0.01 | 3.20 | <0.01 | — | — | — | — | — | — | 0.9 |
| $ZrP_2O_7$ | 46.44 | 52.24 | 0.02 | <0.01 | <0.01 | <0.01 | <0.01 | 2.86 | <0.01 | — | — | — | — | — | — | 1.0 |
| $CaCO_3$ | — | — | — | — | — | 55.72 | <0.01 | 43.78 | <0.01 | — | — | — | — | — | — | 2.2 |
| $SrCO_3$ | — | — | 0.001 | <0.001 | 0.001 | 0.11 | 0.012 | 30.15 | 0.018 | 69.61 | — | — | — | — | — | 0.6 |
| $BaCO_3$ | — | — | — | — | — | — | — | 22.30 | <0.01 | — | 76.50 | — | — | — | — | 10.0 |
| $SiO_2$ | — | — | 99.68 | 0.07 | 0.018 | <0.002 | <0.005 | 0.07 | 0.038 | — | — | — | — | 0.004 | — | 1.0 |
| $Y_2O_3$ | — | — | <0.01 | — | — | <0.01 | — | — | <0.01 | — | — | — | — | — | >99.9 | 1.0 |
| $Ca_3P_2O_8$ | — | 45.53 | 0.01 | 0.02 | — | 53.97 | 0.01 | 0.10 | <0.01 | — | — | — | — | — | — | 2.0 |

As is clear from results of Examples 1-12 and Comparative Examples 21-24 shown in Table 1, the heat resistive sintered bodies according to the present invention could be obtained by setting the calcining temperature to not more than 1,400° C. and milling the calcined powder to the average particle diameter of not more than 7 μm. Further, the sintered bodies were obtained by calcining, milling and sintering the batch mixtures selected from $ZrP_2O_7$, $(ZrO)_2P_2O_7$, $SiO_2$, the phosphate of R and RO under the conditions given in Table 1, in which R denotes an element capable of exhibiting two- or three-valence cations.

As explained above, according to the process for producing the heat resistive phosphate sintered bodies in the present invention, the heat resistive phosphate sintered body having the solid solution composed of $R_yZr_4Si_xP_{6-x}O_{24}$, the thermal expansion hysteresis loss of not more than 0.3%, and the dimensional change of not more than 1% after the heat cycling in which heating and cooling are repeated between 100° C. and 1,260° C. for 100 times can be obtained.

Therefore, when the heat resistive phosphate sintered body according to the present invention is shaped as articles required to exhibit heat resistance and dimensional stability in heat cycling, for instance, in the form of honeycomb structural bodies as shaped by extrusion, the sintered body can be applied as a rotary regeneration type ceramic heat exchanger, a heat conductive heat exchanger, a diesel engine particulate filter, an automobile exhaust gas purification catalyst carrier, a catalyst combustion carrier, insulating materials for housing for ceramic turbocharger rotors, engine manifold, etc. The housing and the engine manifold may be shaped by slip casting, press molding, or injection molding.

EXAMPLE 13

$Zr_2P_2O_9$, $ZrP_2O_7$, $SrCO_3$, and $SiO_2$ shown in Table 3 were measured in amounts of 52.5 wt. %, 22.8 wt. %, 19.5 wt. % and 5.2 wt. %, respectively, and mixed together. The resultant mixture was charged into an alumina crucible, and calcined in air inside the electric furnace at 1,500° C. for 5 hours. The calcined product was milled by a vibration mill for 12 hours to a average grain diameter of 0.8 μm. As grinding media, zirconia stabilized with $Y_2O_3$ shown in Table 2 was used.

The resultant milled powder was kneaded with water and methylcellulose in the kneader, and a bullet was produced from the kneaded matter by a de-airing auger machine, and extruded with a plunger type extruder. After drying, an extrudate was fired in air in the electric furnace at 1,420° C. for 5 hours.

The characteristics of the thus obtained honeycomb fired body are given below. The mean pore size and the total pore volume were measured by a Mercury porosimeter.

| | |
| --- | --- |
| Honeycomb size | 45 mm in diameter × 100 mm long |
| Cell structure | Square cell (thickness of 6 mil, density of 400 cell/inch$^2$) |
| Mean pore size | 0.4 μm |
| Total pore volume | 0.06 cc/g |
| Coefficient of thermal expansion | $-6 \times 10^{-6}$/°C. (40 to 900° C.) |

EXAMPLE 14

$(ZrO)_2P_2O_7$, $ZrP_2O_7$, $BaCO_3$ and $SiO_2$ shown in Table 3 were measured in amounts of 49.2 wt. %, 21.3 wt. %, 24.6 wt. % and 4.9 wt. %, respectively, and mixed together. The resultant mixture was charged into an alumina crucible, and calcined in air inside the electric furnace at 1,500° C. for 5 hours. The calcined product was milled by a vibration mill for 12 hours to the average grain diameter of 1.6 μm. As the grinding media, grinding media of zirconia stabilized with $Y_2O_3$ shown in Table 2 were used.

The resultant milled powder was kneaded with water and methylcellulose in the kneader, and a bullet was produced from the kneaded matter by the de-airing auger machine, and extruder with the plunger type extruder. After drying, an extrudate was fired in air in the electric furnace at 1,650° C. for 5 hours.

The characteristics of the thus obtained honeycomb fired body are given below. The pore diameter and the pore volume were measured by the Mercury porosimeter.

| Honeycomb size | 45 mm in diameter × 100 mm long |
| --- | --- |
| Cell structure | Square cell (thickness of 6 mil, density of 400 cell/inch$^2$) |
| Mean pore size | 0.37 μm |
| Total pore volume | 0.07 cc/g |
| Coefficient of thermal expansion | 9 × 10$^{-6}$/°C. (40 to 900° C.) |

What is claimed is:

1. A heat resistive phosphate sintered body consisting essentially of a solid solution of $R_y Zr_4 Si_x P_{6-x} O_{24}$, wherein x is greater than zero and less than or equal to two, $\frac{2}{3} \leq y \leq 2$, R is a combination of one or more cations having a charge of +2 or +3, and x and y satisfy an electrically neutral condition, said heat resistive phosphate sintered body having a thermal expansion hysteresis not more than 0.3%, a dimensional change after a heat cycling not more than 1%, and a four point flexural strength not less than 100 kg/cm$^2$ after the heat cycling, wherein the heat cycling comprises 100 heating and cooling cycles between 100° C. and 1,200° C.

2. The heat resistive phosphate sintered body of claim 1, wherein the sintered body has microcracks and the thermal expansion hysteresis of the sintered body is 0.03-0.25%.

3. The heat resistive phosphate sintered body of claim 1, wherein the coefficient of thermal expansion of the sintered body is not more than 25×10$^{-7}$/°C.

4. The heat resistive phosphate sintered body of claim 1, wherein a weight-reduction rate of the sintered body after the heat treatment of 1,400° C.×100 hours is not more than 5%.

5. The heat resistive phosphate sintered body of claim 1, wherein a self-weight softening percentage of the sintered body after the heat treatment of 1,400° C.×5 hours is not more than 1%.

6. The heat resistive phosphate sintered body of claim 1, wherein a dimensional change rate of the sintered body after the heat treatment at 1,400° C. for 100 hours is not more than 3.5%.

7. The heat resistive phosphate sintered body of claim 6, wherein the four point flexural strength is not less than 200 kg/cm$^2$.

8. The heat resistive phosphate sintered body of claim 1, wherein a coefficient of thermal expansion of the sintered body is not more than 10×10$^{-7}$/°C.

9. The heat resistive phosphate sintered body of claim 1, which has a honeycomb structure.

10. The heat resistive phosphate sintered body of claim 1, which comprises a combination of one or more of elements of Group IIa in the Periodic Table.

11. The heat resistive phosphate sintered body of claim 1, wherein R consists of at least one of Ca, Sr and Ba, 12. A process of producing a heat resistive phosphate sintered body having a composition of $R_y Zr_4 Si_x P_{6-x} O_{24}$, R being one or more cations having a charge of +2 or +3, comprising the steps of:
preparing a batch mixture of $(ZrO)_2 P_2 O_7$, $ZrP_2 O_7$, RO and/or a phosphate of R, and $SiO_2$;
calcining said bach mixture into a calcined powder at a calcining temperature not less than 1,400° C.;
milling said calcined powder to an average particle diameter not more than 7 microns;
shaping the calcined powder into a shaped body after milling;
firing the shaped body at a firing temperature not less than 1,300° C., wherein said calcining temperature is equal to or higher than the firing temperature.

13. The process for producing the heat resistive phosphate sintered body of claim 12, wherein the calcined powder is milled to the average particle diameter of not more than 2.5 μm.

14. The process for producing the heat resistive phosphate sintered body of claim 12, comprising the step of plasticizing the batch mixture before the shaping step.

15. The process for producing the heat resistive phosphate sintered body of claim 12, wherein said calcining and said firing temperature are held for 1-24 hours.

16. The process for producing the heat resistive phosphate sintered body of claim 12, wherein the calcining temperature is 1,500°-1,600° C.

17. The process for producing the heat resistive phosphate sintered body of claim 12, wherein the firing temperature is b 1,400° C.-1,600° C.

18. The process for producing the heat resistive phosphate sintered body of claim 12, wherein the shaping step is effective by extrusion.

19. The heat resistive phosphate sintered body of claim 1, wherein the grain size is not more than 10 microns.

* * * * *